(12) United States Patent
Nishioka

(10) Patent No.: US 7,249,293 B2
(45) Date of Patent: Jul. 24, 2007

(54) METHOD AND DEVICE FOR TESTING FOR THE OCCURRENCE OF BIT ERRORS

(75) Inventor: Naonori Nishioka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 160 days.

(21) Appl. No.: 10/686,693

(22) Filed: Oct. 15, 2003

(65) Prior Publication Data
US 2004/0073860 A1 Apr. 15, 2004

Related U.S. Application Data

(63) Continuation of application No. PCT/JP01/03265, filed on Apr. 17, 2001.

(51) Int. Cl.
H03M 13/00 (2006.01)
G01R 31/28 (2006.01)
(52) U.S. Cl. ...................................... 714/709; 714/724
(58) Field of Classification Search ................ 714/704
See application file for complete search history.

(56) References Cited

U.S. PATENT DOCUMENTS 5,566,193 A * 10/1996 Cloonan ..................... 714/802

6,094,737 A * 7/2000 Fukasawa ................... 714/738

FOREIGN PATENT DOCUMENTS

| JP | 56-155551 | | 11/1981 |
| JP | 60-033757 | | 2/1985 |
| JP | 64-064430 | | 3/1989 |
| JP | 2002223204 | A * | 8/2002 |

\* cited by examiner

Primary Examiner—Cynthia Britt
(74) Attorney, Agent, or Firm—Katten Muchin Rosenman LLP

(57) ABSTRACT

In a method and a device for testing a plurality of measured devices in parallel by using a single signal generator and a single bit error measuring device, a serial testing signal for is converted and demultiplexed into parallel signals corresponding to channels respectively assigned to a plurality of measured devices and a redundant channel, one of the plurality of parallel signals being a passing signal passing through the redundant channel is converted into a channel determination signal for specifying an alignment of the measured devices, output signals of the measured devices and the channel determination signal are multiplexed corresponding to a demultiplexing mode used for demultiplexing the serial signal, and bit errors are measured in the multiplexed signals and measured devices at which the bit errors are generated are detected in consideration of the channel determination signal.

5 Claims, 5 Drawing Sheets

METHOD AND DEVICE FOR TESTING FOR THE OCCURRENCE OF BIT ERRORS

CROSS-REFERENCE TO RELATED APPLICATION

The present application is a continuation of International Application No. PCT/JP01/03265 which was filed on Apr. 17, 2001.

BACKGROUND OF THE INVENTION

1. Field of the Invention

The present invention relates to a method and a device for testing for the occurrence of bit errors, and in particular to a method and a device for conducting a test for the occurrence of bit errors in a plurality of communication devices.

2. Description of the Related Art

As a method and a device for efficiently testing a plurality of communication devices, following prior art technologies have been already proposed.

Prior Art (1) (See FIG. 6)

As many signal generators 1-1-1-$n$ and bit error measuring devices 5-1-5-$n$ as n ($\geqq 2$) units of measured devices 3-1-3-$n$ are provided to configure respective measurement systems in parallel. Testing signals generated at the signal generators 1-1-1-$n$ are respectively provided to the measured devices 3-1-3-$n$, and the output signals therefrom are respectively transmitted to the bit error measuring devices 5-1-5-$n$ to measure bit errors (bit error rate). Thus obtained bit errors in each measurement system are transmitted to a common measurement controller 10, which commonly controls the signal generators 1-1-1-$n$, whereby the measured devices 3-1-3-$n$ are tested in parallel.

Prior Art (2) (See FIG. 7)

Only a common single signal generator 1 is connected to n units of measured devices 3-1-3-$n$. The common testing signal from this signal generator 1 is provided to the measured devices 3-1-3-$n$, the output signals therefrom are measured at the bit error measuring devices 5-1-5-$n$, and the signal generator 1 is controlled through the measurement controller 10 in the same way as the above-mentioned prior art (1), whereby the measured devices 3-1-3-$n$ are tested in parallel.

Prior Art (3) (See FIG. 8)

A single signal generator 1 in the case of the above-mentioned prior art (2) and a single bit error measuring device 5 are provided to measured devices 3-1-3-$n$, which are connected in tandem. The testing signal from the signal generator 1 is provided to the measured device 3-1, and the output signal therefrom is provided to the bit error measuring device 5 sequentially through the measured devices 3-2-3-$n$.

However, the above-mentioned prior art (1) is not different from the technology of simply providing a plurality of measurement systems respectively composed of a single signal generator, a single measured device, and a single bit error measuring device, so that a measurement operation without operator's intervention is only achieved by automatically controlling these plural measurement systems with the common measurement controller 10. For this reason, expensive measuring devices like signal generators and bit error measuring devices have to be prepared in number as many as the measured devices for which a parallel measurement is desired to be performed, which leads to enlargement of a measurement scale and increase in cost.

Also, it is impossible to simultaneously control each of the measured devices, in which setting and data collection have to be performed sequentially, whereby a measurement speed is lowered as a whole.

Also, in the above-mentioned prior art (2), only a single signal generator is required. However, since the output of the signal generator is commonly transmitted to the measured devices 3-1-3-$n$, n units of bit error measuring devices are still required so that the number of bit error measuring devices can not be reduced.

Furthermore, in the above-mentioned prior art (3), only a single signal generator and a single bit error measuring device are required. However, when a bit error occurs on the way from the measured device 3-1 to the measured device 3-$n$, the output signal of the concerned measured device in which the bit error has occurred becomes a signal including the bit error. Therefore, the measured devices connected following the concerned device can no longer be tested. As a result, the only thing that can be determined is whether or not a bit error exists on all of the measured devices as a whole.

SUMMARY OF THE INVENTION

It is accordingly an object of the present invention to provide a method and a device for testing for the occurrence of bit errors in a plurality of communication devices that are measured devices in parallel by using a single signal generator and a single bit error measuring device.

In order to achieve the above-mentioned object, a method for testing for the occurrence of bit errors according to the present invention comprises the steps of: converting and demultiplexing a serial signal for testing purposes into parallel signals corresponding to channels respectively assigned to a plurality of measured devices and a redundant channel; converting a signal passing through the redundant channel into a channel determination signal for specifying an alignment of the measured devices; multiplexing output signals of the measured devices and the channel determination signal corresponding to a demultiplexing mode used for demultiplexing the serial signal; and measuring occurrence of bit errors in the multiplexed signals and detecting measured devices at which the bit errors are generated in consideration of the channel determination signal.

Also, a device for performing the method for testing occurrence of bit errors according to the present invention may comprise: a signal generator for generating a testing serial signal; a signal demultiplexer for converting and demultiplexing the serial signal into parallel signals corresponding to channels respectively assigned to a plurality of measured devices and a redundant channel; a channel determination signal generating circuit for converting a signal passing through the redundant channel into a channel determination signal for specifying an alignment of the measured devices; a signal multiplexer for multiplexing output signals of the measured devices and the channel determination signal corresponding to a demultiplexing mode of the signal demultiplexer used for demultiplexing the serial signal; and a bit error measuring device for measuring occurrence of bit errors in output signals of the signal multiplexer and detecting measured devices at which the bit errors are generated in consideration of the channel determination signal.

It is to be noted that a signal in which all bits of the signal passing through the redundant channel are inverted may be used as the above-mentioned channel determination signal.

The method and the device according to the present invention will now be specifically described referring to FIGS. 1-4.

FIG. 1 shows a demultiplexing/multiplexing principle of signals for testing purposes in the method and the device for testing for the occurrence of bit errors according to the present invention, comprising a signal generator 1, a single signal demultiplexer 2 for e.g. n=10 channels, measured devices 3-1-3-10 corresponding to the 10 channels, and a single bit error measuring device 5.

The signal generator 1 generates a pulse signal S for testing purposes (e.g. pseudo random pattern whose duty factor or appearance rate of "0"/"1" is approximately 50%) of a signal speed F(b/s) without a frame, and operates asynchronous to the bit error measuring device 5. A serial signal S for testing purposes (hereinafter, occasionally referred to as testing signal S) generated by this signal generator 1 is transmitted to the signal demultiplexer 2.

The signal demultiplexer 2 converts and demultiplexes the testing signal S into parallel signals of 10 channels and distributes the parallel signals to the measured devices 3-1-3-10. In the example of FIG. 1, logic signals "1", "0", "1" ... "1" of bit Nos. "1"-"0" corresponding to the first 10 channels are respectively transmitted to the measured devices 3-1-3-10. The logic signals after the bit No. "A" are similarly demultiplexed for the measured devices 3-1-3-10 by 10 channels.

Thus, the testing signal S of the signal speed F(b/s) is converted into a parallel signal of one-tenth signal speed F/10(b/s), and is simultaneously demultiplexed for the measured devices 3-1-3-10.

The signals passing through the measured devices 3-1-3-10 are transmitted to the signal multiplexer 4, which multiplexes the output signals of the measured devices 3-1-3-10 corresponding to the demultiplexing mode of the signal demultiplexer 2 to be transmitted to the bit error measuring device 5. Accordingly, even if the testing signal S has a pseudo random pattern, the law of the signal pattern is kept between the signal demultiplexer 2 and the signal multiplexer 4, and a bit error can be measured as a signal including a bit error generated at the measured devices 3-1-3-10.

Accordingly, the bit error measuring device 5 can synchronize the multiplexed signal with the measuring device 5 itself, so that once the bit error is measured, the bit error measurements of the measured devices 3-1-3-10 connected can be simultaneously performed.

However, although the measured devices 3-1-3-10 connected can be measured in the parallel measurement system where the testing signal S is simply demultiplexed/multiplexed as shown in FIG. 1, alignment of a measurement start point and a demultiplexing/multiplexing start point can not be determined even if a location (position) of an error bit generation measured by the bit error measuring device 5 can be analyzed. Therefore, the measured device in which the bit error was generated can not be specified, and a bit error of each measured device can not be measured, although a tendency of a bit error rate can be confirmed as a whole.

In the present invention, as shown in FIG. 2, 9 channels among 10 channels are assigned to the measured devices 3-1-3-9, and the remaining single channel (CH10) is made a redundant channel for determining a channel location. A channel determination signal generating circuit 6 for generating a channel determination signal which can be distinguished from a signal passing through the measured devices 3-1-3-9 is connected to the redundant channel CH10, thereby enabling the measured device in which a bit error has occurred to be specified if the channel determination signal is detected from the multiplexed signal when signals are multiplexed at the signal multiplexer 4 and a bit error is analyzed at the bit error measuring device 5. In the example of FIG. 2, it is detected that X pieces of bit errors have occurred at the measured device 3-m.

This channel determination signal generating circuit 6 inverts all bits of the signal passing through e.g. the redundant channel CH10. The signal of the redundant channel CH10 having passed through the channel determination signal generating circuit 6 among the signals multiplexed at the signal multiplexer 4 is logically made to have errors in all bits (all bit errors) (error rate 100%).

Namely, since a bit pattern of a signal used for measuring a bit error is e.g. a pseudo random pattern, that is the duty factor of "0" and "1" is approximately 50%, a bit error rate in a signal disconnection state (fixed to "0" or "1") which is the worst transmission line state never assumes 100%. Therefore, if a signal of all bit errors (error rate 100%) is made a channel determination signal, the signal can be clearly distinguished from the signals passing through other channels.

This will be described referring to FIGS. 3 and 4. In the signal demultiplexer 2, assuming that the channel No. is "7" for the channel determination signal generating circuit 6 assigned to the redundant channel CH10 when an actual measurement is conducted, every 7th channel in a cycle per 10 channels becomes all bit errors. Therefore, every 7th channel is made a start point. In the 1st cycle per 10 channels shown in FIG. 4, it is indicated by hatched squares that bit errors are generated at the 4th and the 9th channels for the 7th channel having all bit errors.

Since the 4th and the 9th channels in this case respectively correspond to the 7th channel (CH7) and the 2nd channel (CH2) in the signal demultiplexer 2, it is found that bit errors have occurred at the measured devices 3-7 and 3-2.

Thus, if the channel having all bit errors is detected from the multiplexed signal based on the number of multiplexed channels and the location of error bits, alignment between the location (position) of the channel used for determining a channel location which becomes a starting point of the multiplexing cycle and the location of the measured device can be specified. Therefore, the measured devices at which error bits are generated can be specified.

BRIEF DESCRIPTION OF THE DRAWINGS

The above and other objects and advantages of the invention will be apparent upon consideration of the following detailed description, taken in conjunction with the accompanying drawings, in which the reference numerals refer to like parts throughout and in which.

DESCRIPTION OF THE EMBODIMENTS

Figure 1:
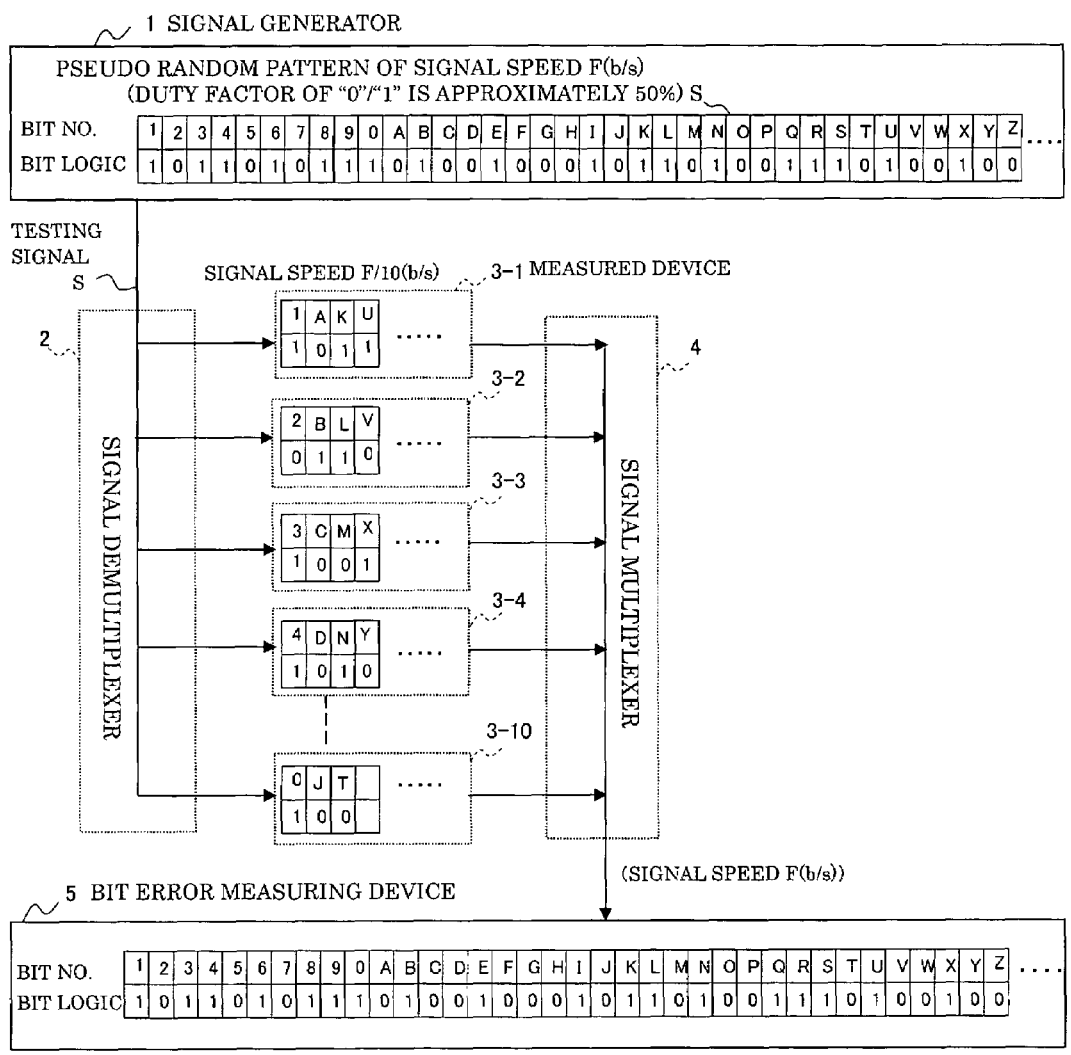
FIG. 1 is a block diagram exemplifying a time division demultiplexing/multiplexing parallel measurement system in a method and a device for testing for the occurrence of bit errors according to the present invention.
Figure 2:
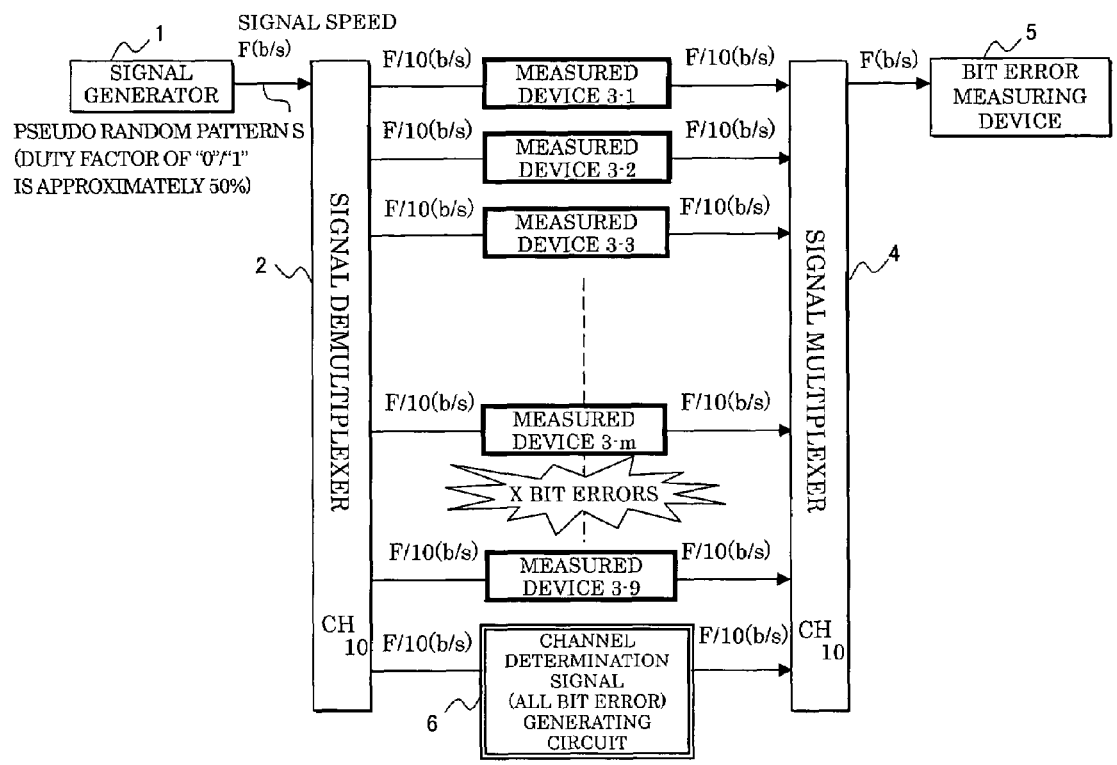
FIG. 2 is a block diagram showing a method and a device for testing for the occurrence of bit errors according to the present invention in which a configuration of determining a channel location is included in the measurement system shown in FIG. 1.
Figure 3:
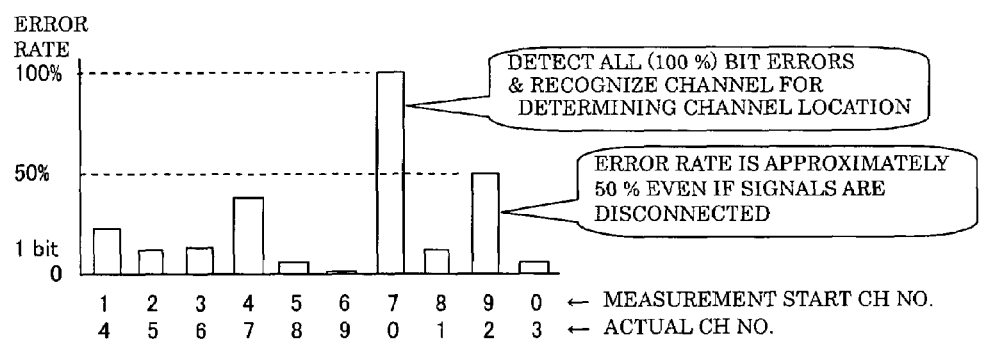
FIG. 3 is a graph illustrating a relationship between a channel determination signal and an actual measured device in a method and a device for testing for the occurrence of bit errors according to the present invention by taking simultaneous measurement of 10 channels as an example.
Figure 4:
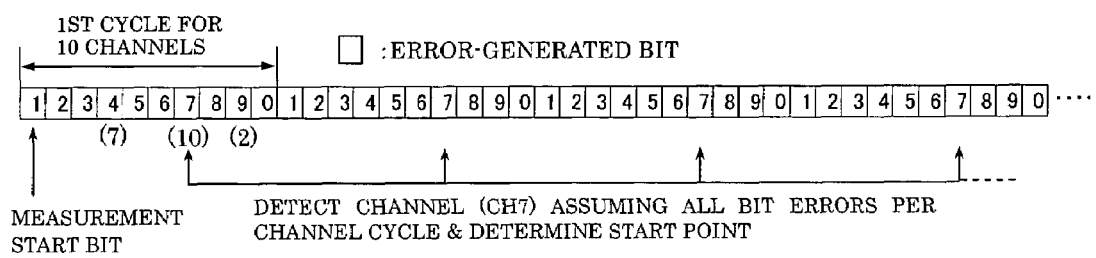
FIG. 4 is a time chart showing a relationship between a channel of all bit errors and a channel of a measured device in which a bit error was generated, corresponding to the principle of the present invention shown in FIGS. 2 and 3.
Figure 5:
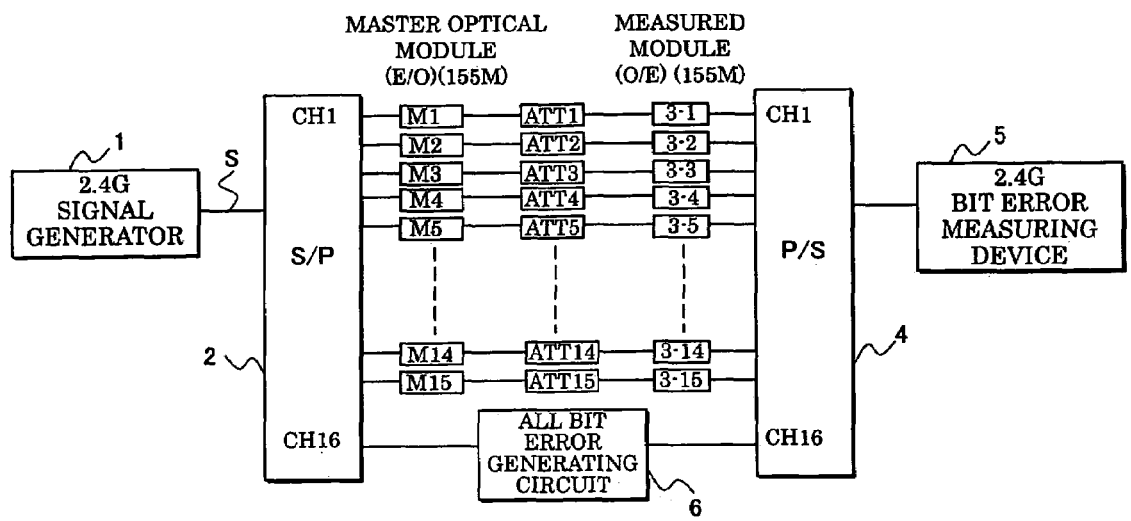
FIG. 5 is a block diagram showing an embodiment of a method and a device for testing for the occurrence of bit errors according to the present invention.
Figure 6:
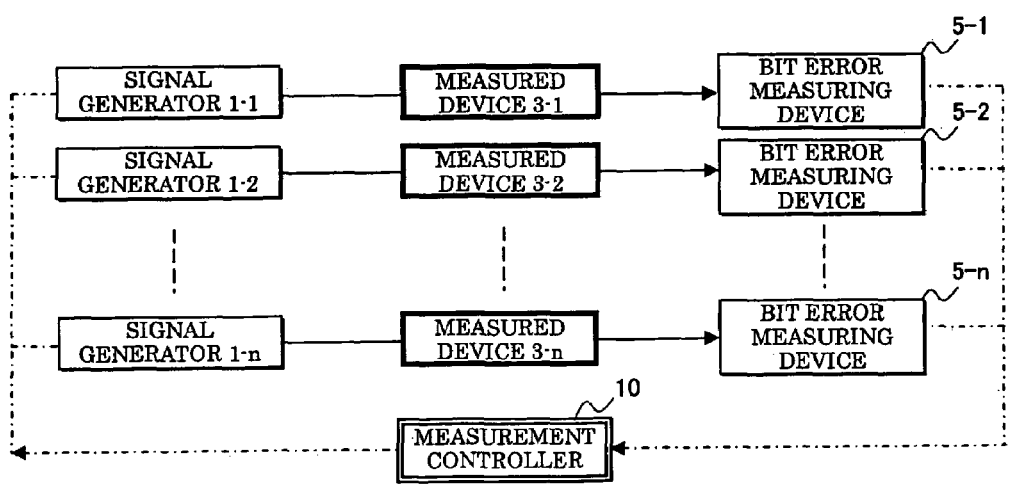
FIG. 6 is a block diagram showing a prior art (1)
Figure 7:
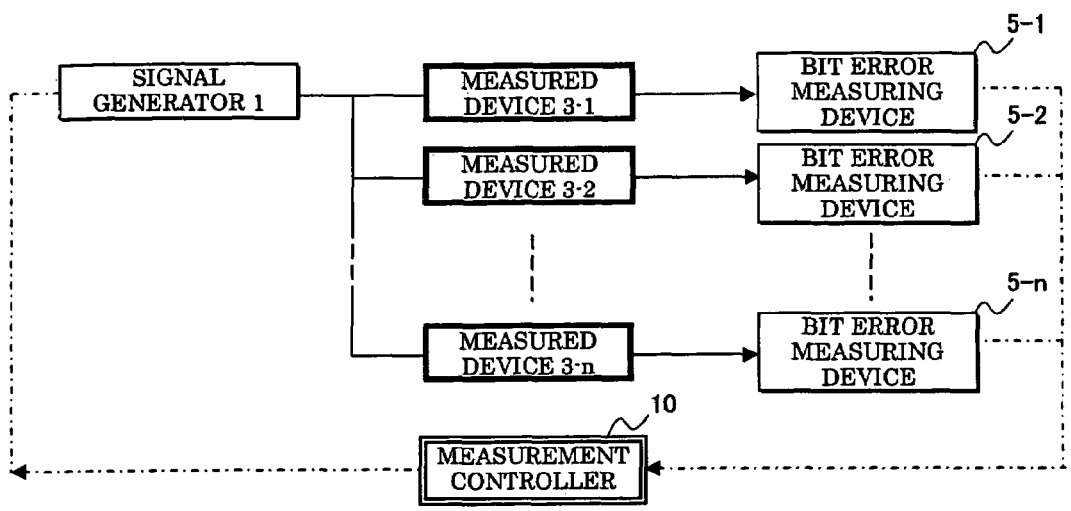
FIG. 7 is a block diagram showing a prior art (2)
Figure 8:
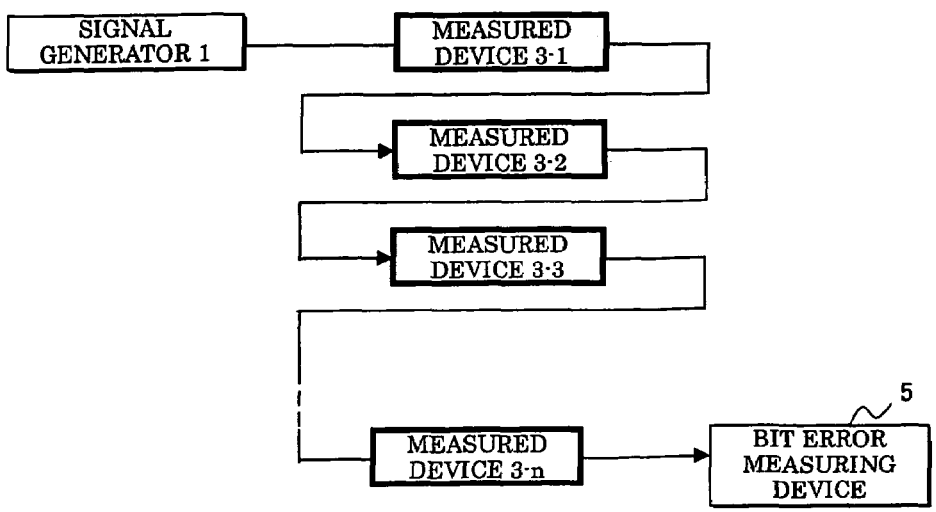
FIG. 8 is a block diagram showing a prior art (3).

FIG. 5 shows a specific embodiment of a method and a device for testing for the occurrence of bit errors according to the present invention shown in FIGS. 1 and 2.

In this embodiment, the signal generator 1 shown in FIG. 5 generates a testing signal S of 2.4G (b/s). The signal demultiplexer 2 has an S/P (serial/parallel) converter with 16 output channels. Specifically, 1-15 channels are assigned to modules 3-1-3-15 as the measured devices and the 16th channel (CH16) is assigned to the all bit error generating circuit 6 as the channel determination signal generating circuit.

In this embodiment, since the measured modules 3-1-3-15 perform an optoelectro conversion (O/E), serial circuits of master optical modules M1-M15 which perform electrooptic conversion (E/O) and optical power adjusters ATT1-ATT15 are respectively inserted into the preceding stages of the measured modules 3-1-3-15.

Furthermore, as the signal multiplexer 4, a P/S (parallel/serial) converter is used corresponding to the S/P converter 2 as the signal demultiplexer, and the output signal therefrom is transmitted to the bit error measuring device 5 of 2.4G (b/s) corresponding to the signal generator 1.

In operation, the testing signal S of 2.4G (b/s) is converted and demultiplexed into parallel signals for 16 channels CH1-CH16 by the S/P converter 2, and the signals are simultaneously inputted to the master optical modules M1-M15 of the channels CH1-CH15. The signal passing through channel CH16 is inputted to the all bit error generating circuit 6 for determining a channel location.

The optical outputs of the master optical modules M1-M15 are inputted to 15 units of measured modules 3-1-3-15 through the optical power adjusters ATT1-ATT15, and the input powers are simultaneously adjusted.

The electric outputs of the measured modules 3-1-3-15 are multiplexed into a signal of 2.4G (b/s) by the P/S converter 4. By measuring bit errors of the multiplexed 2.4G (b/s) signal, the bit error rates of 15 units of measured modules 3-1-3-15 can be measured at once.

Since the location is specified with the channel CH16, which assumes all bit errors (100% error), being made a starting point at this time, bit error rates of the individual measured modules 3-1-3-15 can be measured by analyzing an error generation rate by bits and by calculating histogram by channels.

As described above, a method and a device for testing for the occurrence of bit errors according to the present invention are arranged so that a serial signal for testing purposes is converted and demultiplexed into parallel signals corresponding to channels respectively assigned to a plurality of measured devices and a redundant channel, a signal passing through the redundant channel is converted into a channel determination signal for specifying an alignment of the measured devices, output signals of the measured devices and the channel determination signal are multiplexed corresponding to a demultiplexing mode used for demultiplexing the serial signal, and occurrence of bit errors are measured in the multiplexed signals and measured devices at which the bit errors are generated are detected in consideration of the channel determination signal. Therefore, it becomes possible to measure a bit error rate of a large number of measured devices simultaneously and at a high speed in a measurement system having a pair of signal generator and bit error measuring device. Thus, an improvement of efficiency in testing for the occurrence of bit errors in communication devices can be realized inexpensively.

I claim:

1. A method for detecting a device which causes a bit reversal when the device is in trouble, comprising:

demultiplexing a first serial signal into D(1)-D(N) signals, inputting the D(1)-D(N) signals into devices E(1)-E(N−1) and a channel marking device E(N) respectively, outputting D'(1)-D'(N−1) signals from the devices E(1)-E(N−1) and a D'(N) signal from the channel marking device E(N), wherein the channel marking device E(N) outputs the D'(N) signal by changing the D(N) signal by a certain changing method, multiplexing the D'(1)-D'(N) signals into a second serial signal, finding the D'(N) signal in the second serial signal which has a bit reversal, detecting a device E(X) which causes the bit reversal based on bit positions of a D'(X) signal and the D'(N) signal, wherein an order of bits between the first and the second serial signals is maintained.

2. The method for detecting a device according to claim 1, wherein the certain changing method is all bits reversal.

3. An apparatus for detecting a device which causes a bit reversal when the device is in trouble, comprising:

means for demultiplexing a first serial signal into D(1)-D(N) signals, means for inputting the D(1)-D(N) signals into devices E(1)-E(N−1) and a channel marking device E(N) respectively, means for outputting D'(1)-D'(N−1) signals from the devices E(1)-'E(N-1) and a D'(N) signal from the channel marking device E(N), wherein the channel marking device E(N) outputs a D'(N) signal by changing the D(N) signal by a predetermined changing method, means for multiplexing the D'(1)-D'(N) signals into a second serial signal, means for finding the D'(N) signal in the second serial signal which has a bit reversal, means for detecting a device E(X) which causes the bit reversal based on bit positions of a D'(X) signal and the D'(N) signal, wherein an order of bits between the first and the second serial signals is maintained.

4. The apparatus for detecting a device according to claim 3, wherein the predetermined changing method is all bits reversal.

5. An apparatus for detecting a device which causes a bit reversal when the device is in trouble comprising:

a signal distribution unit demultiplexing a first signal into D(1)-D(N) signals;

devices E(1)-E(N−1) which receive the D(1)-D(N) signals respectively and output D'(1)-D'(N) signals respectively;

a channel marking device E(N) which receives the D(N) signal and outputs D(N) signal by changing the D(N) signal by a predetermined changing method;

a multiplexing unit multiplexing the D'(1)-D'(N) signals into a second serial signal;

a detecting unit which finds the D'(N) signal in the second serial signal which has a bit reversal and detects a device E(X) which causes the bit reversal based on bit position of a D'(X) signal and the D'(N) signal, wherein an order of bits between the first and the second serial signals is maintained.

* * * * *